Sept. 11, 1951 R. A. STENZEL Re. 23,411

WINDROW TURNER

Original Filed Nov. 6, 1945 2 Sheets-Sheet 1

Inventor

Roy A. Stenzel

By Cadman Harley & Cadman

Attorneys

Sept. 11, 1951 R. A. STENZEL Re. 23,411

WINDROW TURNER

Original Filed Nov. 6, 1945 2 Sheets-Sheet 2

Inventor

Roy A. Stenzel

By Cushman, Darby & Cushman

Attorneys

Reissued Sept. 11, 1951

Re. 23,411

UNITED STATES PATENT OFFICE 23,411

WINDROW TURNER

Roy A. Stenzel, Cambridge, Ill.; Margaret Stenzel, executrix of said Roy A. Stenzel, deceased, assignor, by direct and mesne assignments, to Patents and Development, Inc., Raleigh, N. C., a corporation of North Carolina Original No. 2,486,766, dated November 1, 1949, Serial No. 626,930, November 6, 1945. Application for reissue October 23, 1950, Serial No. 191,713

17 Claims. (Cl. 56—372)

Matter enclosed in heavy brackets [ ] appears in the original patent but forms no part of this reissue specification; matter printed in italics indicates the additions made by reissue.

My present invention has for its object to provide means for turning the windrows of grain crops and hay as they lay in the field after being cut.

Another object of my invention is to provide a rotatable device which is driven by contact with the ground and/or the windrow as it is advanced bodily along a windrow by movement of the vehicle to which it is attached, its construction being such that it will turn a windrow of seed crops gently, thus minimizing the loss of seeds.

My invention further comprehends a windrow turner in the form of a rotary wheel to be mounted in a vertical position on a farm vehicle at an angle to the direction of travel which is provided with radial fingers shaped to reach successively beneath the windrow and serve to roll it over enabling it to be displaced laterally as the vehicle advances.

To these and other ends my invention embodies further improvements all as will be fully set forth in the accompanying specification, the novel features thereof being pointed out in the appended claims.

In the drawings.

Similar reference characters in the several figures indicate similar parts.

In many localities where it is customary to use the so-called combines, machines for harvesting and threshing seed crops and crops which produce small grains, it is the practice to windrow them before harvesting. These grains cannot be "combined" as they stand because of the underlying green growth and difficulty is experienced from heavy dew and rain which settles the cut stalks into the stubble. In handling certain of these products of the soil under these conditions it has been necessary heretofore to lift the windrows gently with a hand fork to avoid shattering the grain. Hence it is an object of my invention to lift and turn a windrow in such a manner as to avoid as far as possible the loss of grain or leaves.

In carrying out my invention I provide a rotary member in the form of a wheel mounted on a suitable vehicle, such as a tractor which will straddle a windrow, and mounted in a vertical plane at an angle to the direction of movement of the vehicle and capable of engaging the windrow to elevate the hay or grain slightly and displace it laterally by imparting to the windrow a somewhat rolling action as it is crowded laterally by the bodily advancement of said member.

Figure 1:
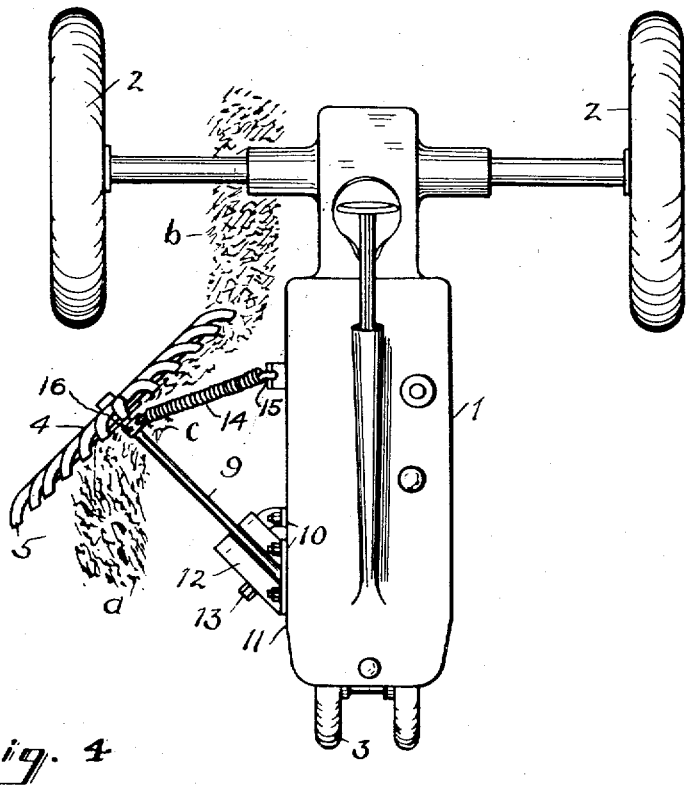
Figure 1 is a top plan view of a farm tractor showing the position a windrow turner embodying my invention occupies in relation thereto and illustrating the line of displacement of the windrow.

The vehicle, indicated by 1, in the present illustration, is a three wheel tractor, the rear or driving wheels 2 of which straddle the windrow, while the forward guide wheel 3 travels along a line considerably to one side thereof. The windrow in Fig. 1 in its first position is indicated at "a," its turned or displaced position by "b," and the portion thereof which is being acted upon continuously and which lies immediately in front of the turning device is indicated by "c."

Figure 3:
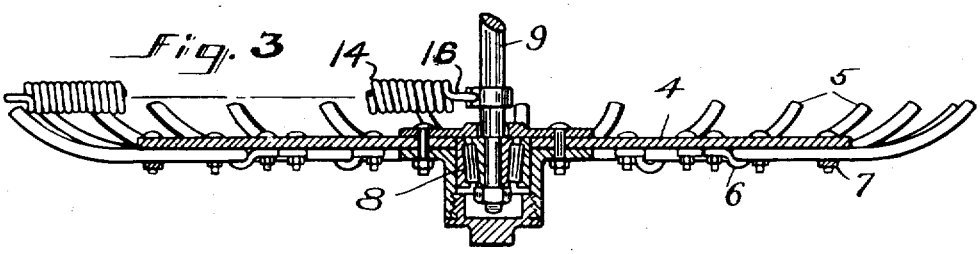
Figure 3 is a horizontal sectional view of the wheel taken on the line 3x—3x of Fig. 2.
Figure 2:
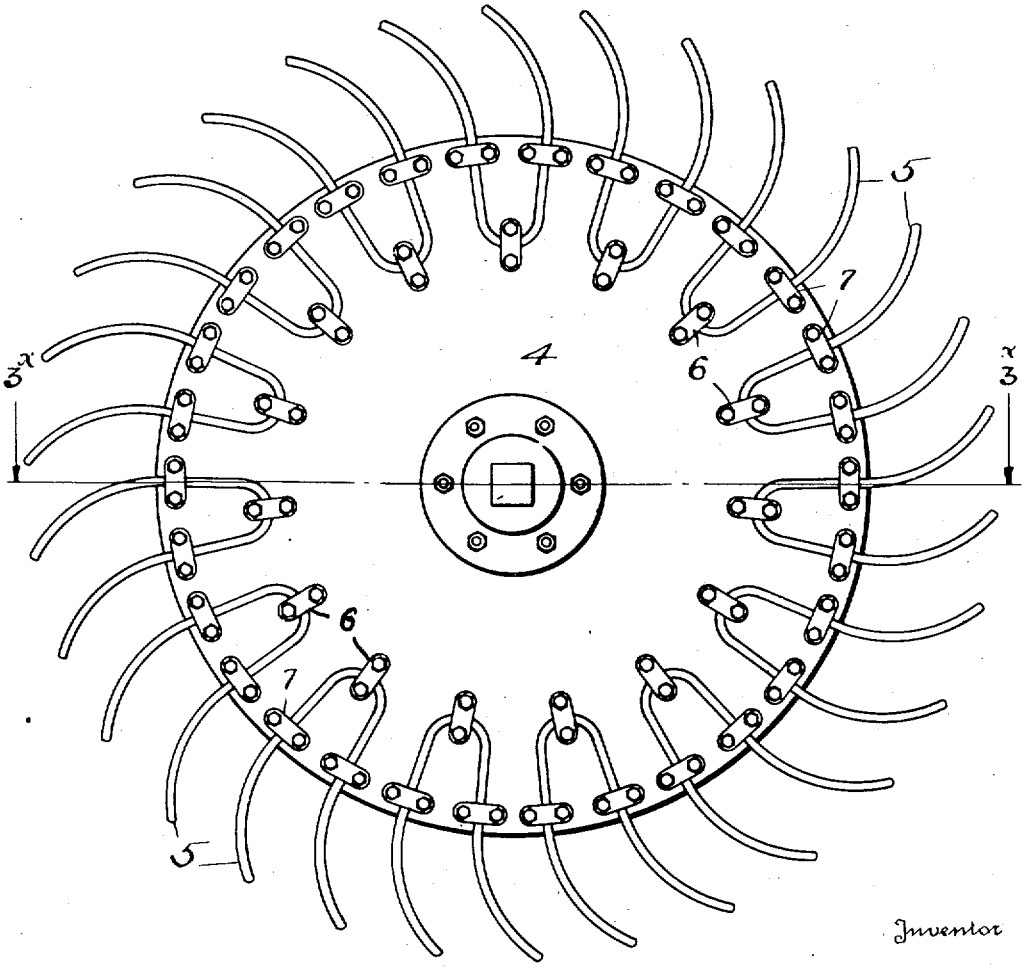
Figure 2 is a view showing the rear face of a windrow turner embodying my invention.

The instrumentality which I employ for accomplishing the foregoing comprises a ground driven wheel, preferably made of a circular disc 4, to avoid its entanglement with straws, stalks, vines, or other litter. Around the periphery of the disc are forking tines 5 which may have some spring action although this is not a requisite of their construction, the desideratum being that they possess sufficient rigidity when in successive contact with the ground surface and the windrow per se that they impart a continuous rotary movement of the disc wheel. Another structure feature of these tines lies in their shape and their position with reference to the periphery of the wheel and the vertical plane in which it revolves. Each of said tines is curved over the forward face of the wheel, i. e. the face which is advancing against the end or inturned portion of the windrow as shown in Fig. 3. These curved ends of the tines are also turned rearwardly opposite to the direction of rotation of the wheel as shown in Fig. 2. In this figure which is a rear view of the disc said disc rotates in a clockwise direction as the tractor moves forwardly hence the last mentioned curvature of the tines is in a counter-clockwise direction. Consequently as they successively engage the plant stalks, forming the windrow, they pass through the stubble beneath them, acting as it were as scoops, to lift the bundle of stalks causing it to roll over as the whole windrow is crowded to one side out of the path of the advancing wheel. The windrow is not lifted materially above the ground surface as the rotation of the wheel, being at an angle and standing vertically, causes the ends of the forking tines which also curve forwardly over the edge of the disc to be dragged entirely free in less than one-quarter of a revolution of the wheel so that in handling seed crops such as red clover, alfalfa, timothy, flax and others, which lose their seeds readily, will not be unduly agitated under such handling. In fact the tines may be made of different length for application to a single wheel, or separate wheels so equipped may be used to handle the windrows of different grains and hay.

A practical form of construction of the wheel is shown in Fig. 2 in which I have shown the tines 5 constructed in pairs by bending rods into U-shapes. Each of these pairs is held at the base by an overlying strap piece 6 bolted to the rear face of the disc 4 at a point well within its circumference. Similar strap pieces 7, adjacent the edge of the disc firmly hold the individual tines in place. This means of mounting the tines provides an unobstructed and practically smooth forward working face on the disc.

The disc 4 rotates on suitable center bearings such as the roller bearings 8, shown in Fig. 3, carrying the trailing end of a shaft *or axle* 9. This shaft extends forwardly of the windrow turning wheel and is connected to the vehicle 1 at an angle of approximately 45°. It is of such length that the wheel lies ahead of the drive wheel on that side of the tractor. The shaft extends horizontally so that the turning wheel normally stands in a vertical position and is caused to rotate in a counterclockwise direction by reason of the successive engagement of its tines 5 with the ground surface and windrow.

Figure 4:
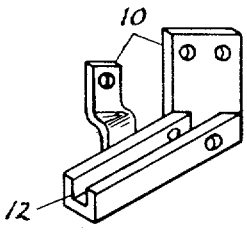
Figure 4 is a perspective view of an attaching bracket.

A convenient means of connecting the shaft 9 with the vehicle comprises a bracket 10, as shown in Fig. 4, attached to its frame side piece 11 carrying an open top box 12 for the reception of the shaft. The latter is pivoted therein at its forward end on a pin 13 to facilitate upward movement of the windrow turner when it is desired to elevate it into an inoperative position, as for instance, when the vehicle is traveling from one place to another. *A spring 14 has one end fastened to the vehicle at 15 and its other end fastened at 16 to the outer end of shaft 9.*

An additional advantage of windrow turners embodying my invention resides in their universal applicability to farm tractors of different make, any one of which may be readily adjusted for this type of work by merely adjusting the rear right hand wheel outwardly on its axle a distance depending on its size and the size of its tire. Another advantage is found in the fact that a windrow turner thus constructed will not "wrap" or "bunch" the windrows.

My invention of locating a windrow turning wheel on a vehicle at one side of its longitudinal center, or on one side thereof at an angle to its direction of movement and positioning it between the front and rear wheels provides a simple arrangement of parts whereby a windrow may be turned completely beneath the moving vehicle without being thrown into the path of any of the wheels. Moreover, being placed in this position ample latitude for manipulation of the vehicle is allowed without overrunning a windrow in the event a windrow does not lie in a straight line. Then too, this location of the turning element reduces to a minimum the effect of the drag created and its influence upon the steering of the vehicle.

I claim:

1. An attachment for tractors for turning windrows comprising a bracket for attachment to a forward point at one side of the tractor, a shaft in pivotal relation to the bracket and supported thereby in a horizontal position and extending laterally and rearwardly with relation to the forward direction of travel of the tractor, a wheel journaled on the outer end of the shaft and rotatable in a vertical plane, and tines rigidly attached to one face of the wheel having free ends projecting beyond its periphery and curved in a direction to lift and roll a windrow laterally with relation to the forward direction of movement of said tractor.

2. A windrow turner comprising a vertically supported disc mounted for rotation in a plane lying at an angle to the longitudinal direction of a windrow and a plurality of sets of tines bent into U-shape overlying one face of the disc and having free extremities projecting beyond its periphery, clip members secured to the disc and engaging said bends, other clips secured to the disc adjacent its periphery engaging intermediate portions of the tines, the free ends of the tines being curved forwardly of the plane of the disc and rearwardly of its direction of rotation.

3. A windrow turning device for use on tractors comprising a disc rotatable at an angle to the direction of movement of the tractor and tines on the disc extending forwardly over the periphery of the disc, the free ends of which are curved opposite to the direction of rotation of the disc for engaging beneath a windrow in front of said disc and serving to lift the windrow and roll it bodily laterally ahead of the disc.

4. A windrow attachment for a tractor comprising a shaft extending laterally and rearwardly from a forward position on a tractor, a disc journaled on the free end of the shaft ahead of one of the rear wheels of the tractor and radial tines on the disc provided with curved ends extending forwardly of the disc and also curved rearwardly with reference to the direction of rotation of the disc and serving to engage beneath a windrow and roll it bodily laterally ahead of the disc.

5. *An attachment for farm vehicles for turning windrows comprising a bracket or the like for attachment to a farm vehicle, means pivotally connected to said bracket for vertical movement and extending outwardly at an acute angle with relation to the forward direction of travel of the farm vehicle, a wheel-like member rotatably journalled on the outer end of said means, tines attached to the wheel-like member having free ends projecting rearwardly with respect to the direction of rotation of the wheel-like member to roll a windrow laterally with relation to the forward direction of movement of said farm vehicle.*

6. *An attachment for farm vehicles for turning windrows comprising a bracket or the like for attachment to a farm vehicle, means pivotally connected to said bracket for vertical movement and extending outwardly at an acute angle with relation to the forward direction of travel of the farm vehicle, a wheel-like member rotatably journalled on the outer end of said means, resilient tines attached to the wheel-like member having free ends beyond its periphery to lift and roll a windrow laterally with relation to the forward direction of movement of said farm vehicle upon rotation of the wheel-like member by the resistance of obstructions against the lower portion thereof and the forward movement of the vehicle,* and resilient means extending between said pivotally connected means and the vehicle.

7. An attachment for tractors for turning windrows comprising a bracket or the like for attachment to a tractor, means pivotally connected to said bracket for vertical movement and extending outwardly at an acute angle with relation to the forward direction of travel of the tractor, a disc-like member rotatably journalled on the outer end of said means, tines attached to the disc-like member having their free ends projecting rearwardly with respect to the direction of rotation of the disc-like member to roll a windrow laterally with relation to the forward direction of movement of said tractor, said bracket including means to limit the downward movement of said first-named means.

8. A windrow turning device for use with a farm vehicle comprising a frame, a shaft pivotally connected to said frame to rise and fall relative to said frame, said shaft including a journal portion, said journal portion being so located as to be positioned rearwardly of said pivotal connection and having its axis at an acute angle with reference to the forward direction of travel of the vehicle, a wheel-like member journalled on said journal portion so as to be freely rotatable, tines on the wheel-like member having their free ends extending beyond the periphery of the wheel-like member to engage a windrow and roll it bodily ahead of said member and displace it laterally thereof, said wheel-like member being rotatable by the resistance of obstructions against the lower portion thereof and the forward movement of the vehicle.

9. A windrow turning device for use with a farm vehicle comprising a wheel-like element, means to support said element for rising and falling movement with respect to the farm vehicle and for rotation in its own plane and at an angle to the direction of movement of the vehicle by the resistance of obstructions against the lower portion of the element as the latter is advanced with the vehicle, said element including tines extending forwardly relative to the plane of rotation of the wheel-like element for engaging a windrow in front of said element with a scooping action and serving to lift the windrow and roll it bodily laterally ahead of the element.

10. A windrow turning device for use with a farm vehicle comprising a wheel-like element, means to support said element for rising and falling movement with respect to the farm vehicle and for rotation in its own plane and at an angle to the direction of movement of the vehicle by the resistance of obstructions against the lower portion of the element as the latter is advanced with the vehicle, said element including tines which are bent with respect to a radius of said wheel-like element so as to cause the free ends of the tines to extend in a trailing direction with respect to the direction of rotation of the wheel-like element.

11. A windrow turning device for use with a farm vehicle comprising a wheel-like element, means to support said element for rising and falling movement with respect to the farm vehicle and for rotation in its own plane and at an angle to the direction of movement of the vehicle by the resistance of obstructions against the lower portion of the element as the latter is advanced with the vehicle, said element including tines which are resilient but possess sufficient rigidity that when in successive contact with obstructions against their lower portions they impart a continuous rotary movement to the wheel-like element and serve to lift a windrow and roll it bodily laterally ahead of the element, said tines extending rearwardly with respect to the direction of rotation of the wheel-like element.

12. A windrow turning device for farm vehicles comprising a wheel-like member, an axle element to support said member in a substantially erect plane, and means rigid with said vehicle to maintain the axis of said axle element at an acute angle with respect to the direction of forward travel of the vehicle, said means and axle element being so constructed and arranged relative to each other that said axle element will move vertically relative to said means so that the outer end of the axle element will be free and will permit the wheel-like member to rise and fall in response to irregularities of the terrain over which it is advanced, said member being rotated by the resistance of obstructions against its lower portion.

13. A windrow turning device of the character described in claim 12 including resilient means extending between said axle element and said vehicle.

14. A windrow turning device for use on farm vehicles comprising a rotary member rotatable in a substantially erect plane at an angle to the direction of movement of the farm vehicle and tines on the member which are resilient but possess sufficient rigidity that when in successive contact with obstructions against their lower portions they impart a continuous rotary movement to the member as it is advanced with the vehicle, the free ends of the tines being bent opposite to the direction of rotation of the member for engaging a windrow to roll it bodily ahead of the member and displace it laterally of the member, said member being free to rise and fall in accordance with irregularities of the terrain over which it is advanced.

15. A windrow turning device of the character described in claim 14 wherein the major portion of the rotary member is closed to prevent entanglement of material therewith.

16. A windrow turning device for farm vehicles comprising a wheel-like member, a shaft element having an axle portion associated therewith to support said wheel-like member in a substantially erect plane for free rotation, and supporting means connected to said vehicle, said supporting means and shaft element being so constructed and arranged with respect to each other as to maintain the axle portion of said shaft element at an acute angle with respect to the direction of forward travel of the vehicle, said shaft element also being connected to said supporting means for vertical movement relative to said vehicle, the axle portion of said shaft element being free so that the rising and falling movement of the axle portion is controlled by the wheel-like member as said member rises and falls in accordance with irregularities of the terrain over which it is advanced with the vehicle, the entire weight of said supporting means being borne by the vehicle, said member being provided with tines to engage a windrow and roll it bodily ahead of said member and displace it laterally thereof, said member being rotatable by the resistance of obstructions against the lower portion thereof and the forward movement of the vehicle.

17. A windrow turning device for use with farm vehicles comprising a frame, a wheel-like member, support means extending from said frame to support said wheel-like member, said support

*means having an axle portion associated therewith on which said wheel-like member is supported in a substantially erect plane for free rotation, said frame and support means being so constructed and arranged with respect to each other as to maintain the axle portion of said support means at an acute angle with respect to the direction of forward travel of the vehicle, said support means being pivotally connected to said frame for vertical movement relative to said frame, so as to permit said wheel-like member to rise and fall in accordance with irregularities of the terrain over which it is advanced with the vehicle, resilient means extending between said support means and said frame, said wheel-like member being provided with tines having their free ends extending in a trailing direction with respect to the direction of rotation of the wheel-like member to engage a windrow and roll it bodily ahead of said member and displace it laterally thereof, said tines being resilient but possessing sufficient rigidity that when in successive contact with obstructions against their lower portion they impart a continuous rotary motion to the wheel-like member as it is advanced with the vehicle.*

ROY A. STENZEL.

REFERENCES CITED

The following references are of record in the file of this patent or the original patent:

UNITED STATES PATENTS

| Number | Name | Date |
|---|---|---|
| 468,382 | Beck | Feb. 9, 1892 |
| 489,672 | Gibbs | Jan. 10, 1893 |
| 1,244,982 | Horst | Oct. 30, 1917 |
| 1,497,526 | Martin | June 10, 1924 |
| 2,371,076 | Stevens | Mar. 6, 1945 |

FOREIGN PATENTS

| Number | Country | Date |
|---|---|---|
| 27,653 | Great Britain | Sept. 8, 1904 |
| 44,753 | Austria | Nov. 10, 1910 |
| 16,403 | Great Britain | May 23, 1912 |
| 617,583 | France | Nov. 22, 1926 |
| 708,749 | France | May 5, 1931 |